June 21, 1932. H. FRITSCHI 1,864,129
MACHINE TOOL STRUCTURE
Filed Dec. 18, 1930 2 Sheets-Sheet 1
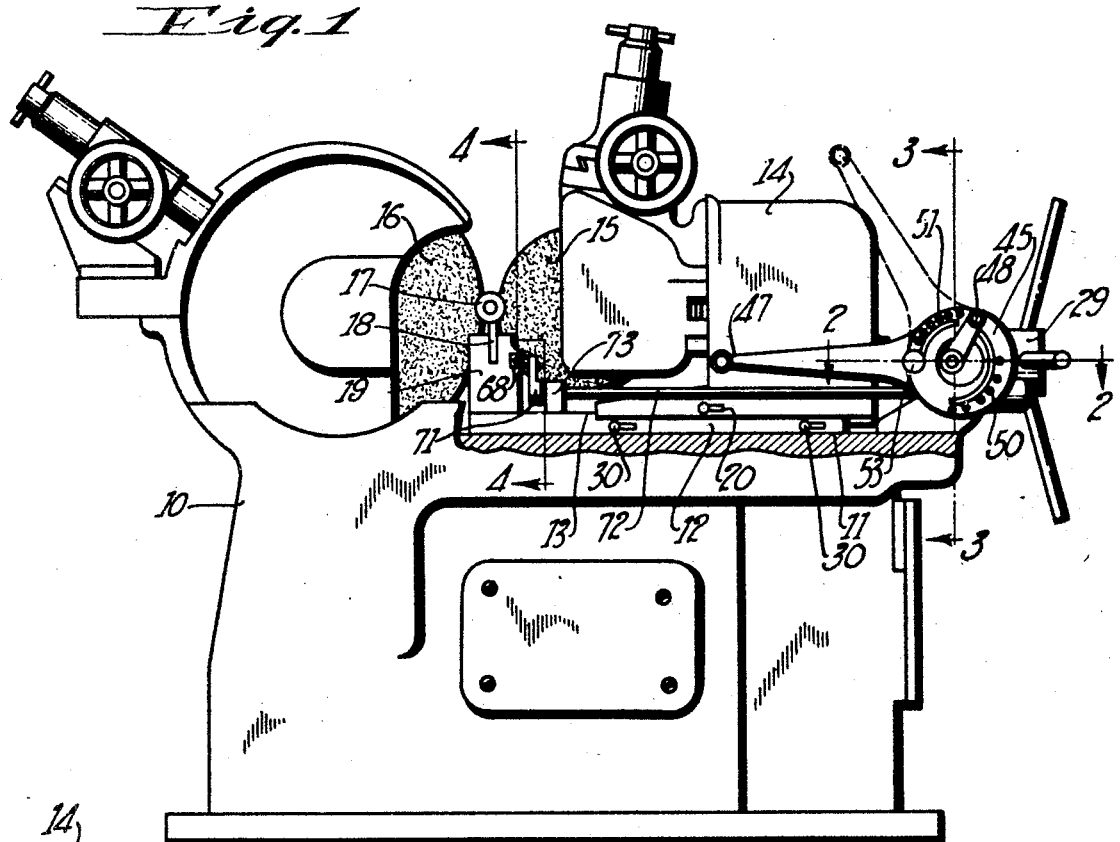
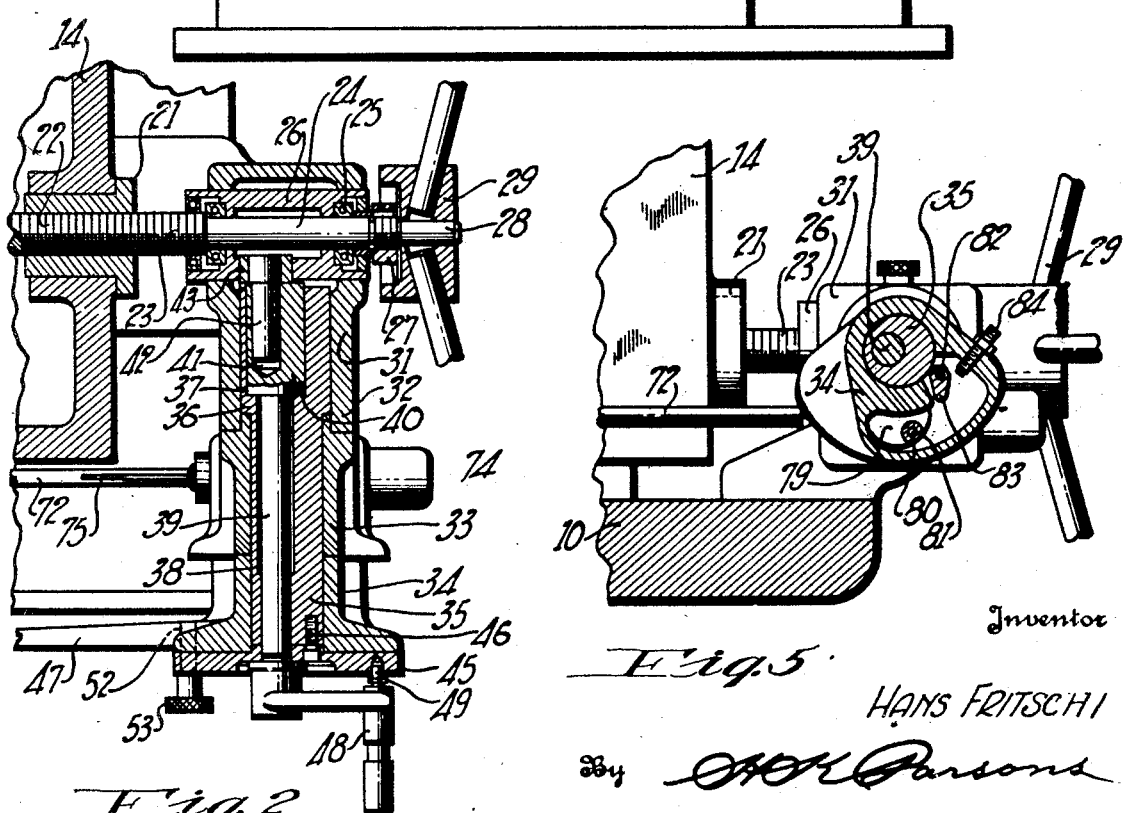
Inventor
HANS FRITSCHI
By AHH Parsons
Attorney

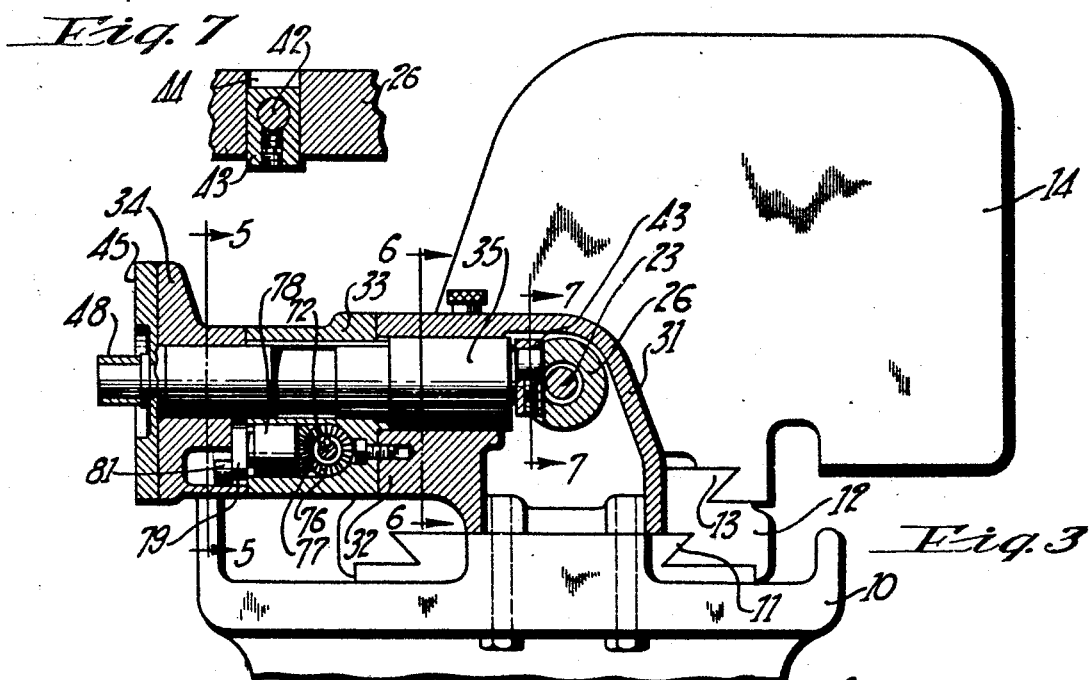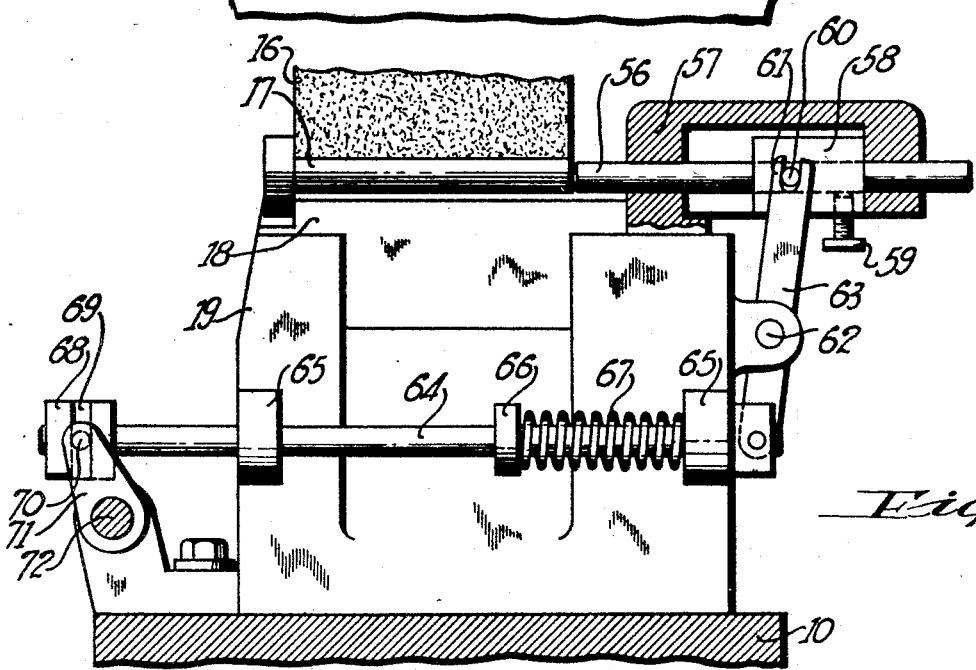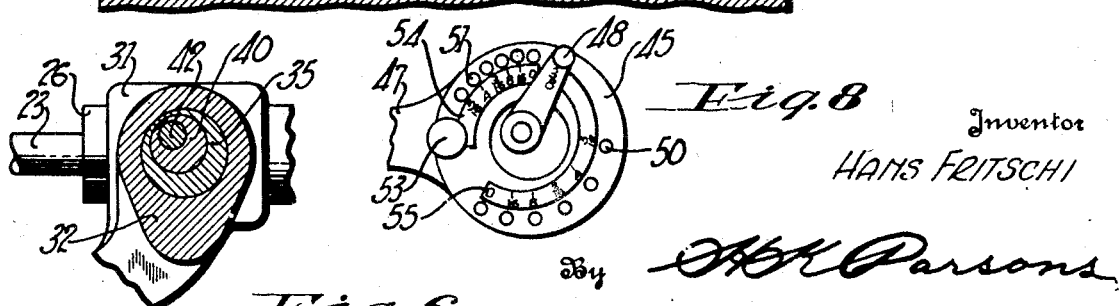

Patented June 21, 1932

1,864,129

UNITED STATES PATENT OFFICE

HANS FRITSCHI, OF CINCINNATI, OHIO, ASSIGNOR TO CINCINNATI GRINDERS INCORPORATED, OF CINCINNATI, OHIO, A CORPORATION OF OHIO

MACHINE TOOL STRUCTURE

Application filed December 18, 1930. Serial No. 503,263.

This invention relates to improvements in means for actuating a reciprocating member of a machine tool organization.

An object of the invention is the provision of improved means for reciprocating a feeding member, or the like, of a machine tool organization to effect the proper feeding movement between a work piece and tool for operation thereon.

Another object of the invention is the provision of improved manually actuable means operable between definite limits of movement but effecting different feeding increments.

A further and specific object of the invention is the provision of an improved regulating wheel actuator for shifting the regulating wheel unit through different zones.

Other objects and advantages of the present invention should be readily apparent by reference to the following specification considered in conjunction with the accompanying drawings and it is to be understood that any modifications may be made in the exact structural details there shown and described, within the scope of the appended claims, without departing from or exceeding the spirit of the invention.

In the drawings:

Figure 1 is a front elevation of a machine embodying the improvements of this invention.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a sectional view on line 5—5 of Figure 3.

Figure 6 is a sectional view on line 6—6 of Figure 3.

Figure 7 is a sectional view on line 7—7 of Figure 3.

Figure 8 is an enlarged fragmentary elevational view of certain parts shown in Figure 1.

Throughout the several views of the drawings similar reference characters are employed to denote the same or similar parts.

The invention is capable of general use for effecting an actuation or feeding movement of a reciprocating part, slide, or the like, of a machine tool organization and is not to be interpreted as restricted solely to the use of a centerless grinding machine which has been chosen for illustrative purposes and depicted in the drawings. The invention will accordingly be described in conjunction with a centerless grinder which device may comprise a bed 10 having formed at the upper end thereof ways 11 for a slide 12 translatable relative to the bed on the ways 11. The slide 12 provides ways 13 for a regulating wheel unit 14 actuable relative to the slide 12 or therewith as a unit. The regulating wheel unit 14 rotatably supports the regulating wheel 15 rotatable at a relatively slow work controlling rate of speed in a clockwise direction, as viewed in Figure 1. Opposed to the active periphery of the regulating wheel 15 is a grinding wheel 16 rotatably supported by the bed 10 and driven at a high grinding rate of speed in a clockwise direction. The opposed proximate portions of the wheels 15 and 16 travel in opposite directions and are spaced from one another to provide a grinding throat in which the work 17 is positioned for operation thereon. The said work 17 is peripherally supported by a work rest blade 18 adjustably secured in a block 19 carried by the forward end of the lower slide 12 and subtending the grinding throat.

The slides 12 and 14 are actuated relative to one another for setting up purposes and to determine the proper position of the work rest blade 17 and active faces of the wheels 15 and 16 at which time they are clamped together by clamp 20. For adjusting the said slides the upper slide or regulating wheel unit 14 is provided with a nut 21 held against rotation and receiving the threaded end 22 of adjusting screw 23. Adjacent the threaded portion 22, the screw 23 has a plane portion 24 journaled in anti-friction bearings 25 supported by a sliding block 26. The block 26 is held against axial movement relative to the screw 23 by a nut 27 fast on the outer end of the screw 23. The adjusting screw 23 is provided with a further reduced portion 28 beyond the nut 27 for a pilot or hand wheel 29 whereby the said screw may be rotated. From this it will be seen that rotation of the screw 23 by means of the hand or pilot wheel 29 will effect an actuation of the slides 12 and 14 as a unit when the said slides are secured to one another by the clamp 20. In order to move the regulating wheel unit or upper slide 14 independently of the lower slide 12, additional clamps 30 are provided whereby the said lower slide 12 is secured to the bed 10 and by opening or releasing the clamp 20 the said upper slide or regulating wheel unit 14 may be actuated through the medium of the adjusting screw 23.

Centerless grinders are employed to perform two kinds or types of grinding known as the in-feed method and through-feed method. By through-feed method of grinding is meant passing the work from one end to the other of the grinding throat when the said throat is relatively fixed, while by in-feed grinding is meant the enlargement of the grinding throat to permit the insertion of the work piece therein contracting the grinding throat to reduce the work to the desired size and subsequently removing the work piece from the throat. This invention pertains primarily to improvements in the in-feed method of grinding and to the particular mechanism for effecting the change in size of the grinding throat although it is to be understood that the mechanism may be used with equal facility for effecting a reciprocation or movement of a member or part of a machine tool organization other than that shown.

The sliding block 26 is slidably journaled in a bracket member 31 supported by the bed 10. The bracket 31 has extending therefrom a bearing sleeve 32 to which is secured an extension bearing sleeve 33. A bearing cap 34 is in turn secured to the end of extension bearing sleeve 33. A hollow shaft 35 is journaled in the cap 34, extension sleeve 33, and bearing sleeve 32, it being provided with an enlarged carrier portion 36 interiorly of the bearing sleeve 32. The carrier portion 36 is provided with an eccentric bore 37 of a relatively large diameter which bore has extending therefrom concentric therewith a relatively smaller bore 38 extending through the hollow shaft 35 beyond the carrier portion 36. An eccentric shaft 39 is journaled in the bores 37 and 38 having an enlarged head portion 40 received in the enlarged bore 37 of the carrier 36. The head portion 40 of the shaft 39 is in turn provided with a socket 41 having its axis eccentric to the axis of the shaft 39 and to the axis of the hollow shaft 35. A pin 42 is journaled in the socket 41 having secured to its outer end a shoe 43 received in a groove or slot 44 formed in the side of the sliding block adjacent the bearing sleeve 32. A plate 45 is secured by any suitable or desirable means, such as cap screws 46, to the end of the hollow shaft 35 and bears against the cap 34. A handle or lever 47 is secured to or preferably formed integral with the bearing cap portion 34 and extends therefrom toward the grinding throat, as shown in Figure 1. A handle member 48 is secured to the portion of the shaft 39 which extends beyond the cap bearing portion 34 and plate 45 and the handle 48 is provided with a spring pressed plunger 49 for engagement in sockets 50 formed in the plate 45. The plate 45 is further provided with perforations 51 adapted to register in various positions of adjustment with a threaded perforation 52 formed in the body of the handle or lever 47 and through which registered perforations a locking stud extends for locking the plate 45 and handle 47 to one another. Index plates 54 and 55 are mounted adjacent the perforations and sockets 51 and 50 respectively, carrying identical markings to indicate the amount of reciprocation to be given the slidable member when the locking members are engaged in the proper perforations and sockets. As shown in Figure 8 each plate is graduated from zero to three eighths by increments of one sixteenth of an inch.

The operation of the structure thus far described is as follows: As shown in Figure 1 the handle member 47 is oscillated from the position shown in dotted lines to the position shown in full lines for shifting the upper slide or regulating wheel unit 14 and regulating wheel 15 toward the grinding wheel a definite amount, namely: three eighths of an inch, as shown by the markings on the plate. A reverse actuation of the handle 47 from the solid line position to the dotted line position will retract the said unit a corresponding amount opening the grinding throat a distance to permit the replacement of the finished work therein. If it were not desired to shift this unit through the maximum travel of three eighths of an inch the spring pressed plunger would be withdrawn from the socket it now engages and advanced to either of the other sockets depending upon the size and type of work to be finished. Assuming it is desired to shift the regulating wheel unit through a path of one quarter of an inch the plunger 49 would be placed in the socket adjacent the plate carrying the one fourth indication mark. This would mean that the handle of the plunger 49 would be actuated in a clockwise direction, as seen in Figure 1, which would rotate the eccentric shaft 39 in a corresponding direction tending to place the axis of the pin 42 in carrier 40 in co-incidence with the axis of the hollow shaft 35 thereby cutting down the eccentricity between the axis of the pin 42 and axis of the hollow shaft 35. This, however, would change the arc or zone of movement of the handle 60 in order to permit of a quarter inch shifting of the regulating wheel unit and in order to actuate the said handle 47 through the same arcuate zone it is now adjusted relative to the plate 45 by withdrawing the locking pin 53 and through the use of lever 48, while engaged in the socket of its present adjustment, rotating the plate 45, hollow shaft 35 and eccentric shaft 39 as a unit in a counter clockwise direction to align the perforation adjacent the quarter mark on the index plate 54 with the perforation 52 in the handle 47 whereupon the locking pin 53 is again screwed home to lock the plate 45 and bearing cap 34 to one another. Oscillation of the lever 47 now, through the arc or from the solid line position to the dotted line position of Figure 1, will shift the regulating wheel one quarter of an inch toward and from the grinding wheel.

It is to be understood that while the index plates 54 and 55 carry indicia for setting the parts for movement from zero to three eighths of an inch that any other adjustment may be made requiring only a change in the relation of the axes of the hollow shaft 43, eccentric shaft 39 and carrier pin 42.

In order that the work piece 17 may be readily replaced in the grinding throat at the conclusion of a grinding operation on the preceding piece it is arranged to be automatically ejected from the said grinding throat. To this end the work abuts a stop and ejector rod 56 slidably mounted in a bracket 57 carried by the work rest block 19. The axial position of the rod 56 may be adjusted by shifting slide block 58 adjustably secured thereto by a screw 59 axially of the bar. The said slide block has projecting therefrom a pin 60 received in the forked end 61 of lever 63 pivoted at 62 intermediate its ends to the work rest block 19. The lower end of lever 63 is pivoted to the inner end of slide rod 64 slidably carried by bosses 65 projecting from one face of the block 19. A collar 66 is secured to the rod 64 intermediate its ends and forms one abutment for a spring 67 coiled about the rod 64 and abutting on its opposite end with one of the bosses 65. The spring being utilized for yieldingly returning the parts to their normal position after bar 64 has been shifted in one direction by the lever 47, as will now be described. To this end the rod 64 has fastened to its outer end a shifter head 68 having formed therein a groove 69 receiving pin 70 projecting from crank 71 on one end of rock shaft 72. The rock shaft 72 is journaled adjacent the crank 71 in a bearing 73 and extends along the front of the machine toward the right hand end thereof, as seen in Figure 1, and has its end journaled at 74 in the sleeve bearing portion 33. The rock shaft 72 has formed therein a spline 75 receiving a key depending interiorly from bevel gear 76 journaled in a suitable bearing formed in the bearing sleeve portion 33. A second bevel gear 77 meshes with the bevel gear 76 and has its shank journaled in a bearing 78 in the intermediate bearing sleeve portion 33 extending at right angles to the bearing or bevel gear 76. A flange 79 is formed on the outer end of the bevel gear 77 and has extending therefrom a pin 80 on which is mounted a roller 81. The bearing cap portion 34 is hollow and moves with the hollow shaft 35 and lever 47, as above described, and has protruding from a flange thereof a pin 82 on which is mounted pendant 83. Extending adjustably through the outer wall of the cap portion 34 is an abutment screw 84 for engagement with one side of the pendant 83 to limit its independent movement about the pin 82.

The operation of the ejector mechanism is as follows: As was noted above, the hand lever 47 is oscillated from the dotted line position in Figure 1 to a full line position for feeding the regulating wheel unit toward the grinding wheel and reverse for effecting a reverse shifting of that unit. As the handle 47 is actuated from the solid line position to the dotted line position the cap bearing portion 34 is correspondingly shifted carrying with it the pin 82, pendant 83 and adjustable stop screw 84. During the major portion of the movement of the handle these parts move toward the roller 81 until the side of the pendant opposite to that engaged by the screw 84 engages the roller 81 whereupon additional movement of the handle will, through the pendant 83, rotate the bevel gear 77 and through this gear the bevel gear 78 and rock shaft 72. Oscillation or rocking of the shaft 72 and crank 71 shifts the cross head 68 to correspondingly shift the rod 64 to the left, as seen in Figure 4, thereby actuating the ejector pin 56 to the right and kicking or ejecting the finished work piece from the grinding throat. At the time the handle 47 reaches the dotted line position in Figure 1 the pendant 83 slides over the top of the roller 81 whereupon the spring 67, previously compressed, expands to return the ejector pin, cross head and rock shaft to their normal position whereupon a new work piece may be placed in the grinding throat upon the work rest blade 18 and the operation of the mechanism repeated.

From the foregoing description it will be noted that an improved reciprocating mechanism has been provided having a definite path of travel while shifting or reciprocating the member to be operated thereby through a variable path depending on the adjustment thereof. It will also be noted that when utilized with machine tool organization for effecting a relative feeding movement between the work support and the tool that at the completion of the work on the work support it is automatically ejected therefrom.

What is claimed is:

1. In a machine tool organization the combination of a bed, a shiftable member carried thereby, an oscillatable lever, an eccentric operable by the lever, means connecting the eccentric with the shiftable member whereby oscillations of the eccentric are converted into reciprocations of the member, and means for varying the throw of the eccentric.

2. In a machine tool organization the combination of a bed, a member carried thereby and shiftable relative thereto, a manually actuable lever carried by the bed oscillatable through a given arc, means connecting the lever with the shiftable member whereby the oscillations of the lever are converted into reciprocations of the member, and means changing the length of reciprocations of the member for the given oscillations of the lever.

3. In a machine tool organization the combination of a bed, a member carried thereby and shiftable relative thereto, a manually actuable lever carried by the bed oscillatable through a given arc, means connecting the lever with the shiftable member whereby the oscillations of the lever are converted into reciprocations of the member, means changing the length of reciprocations of the member for the given oscillations of the lever, and additional means for changing the zone through which the reciprocations of the member take place.

4. In a machine tool organization the combination of a bed, a slide carried thereby and shiftable relative thereto, an adjusting screw coupled with the slide for adjusting the position of the slide, and means for axially reciprocating the screw for shifting the slide through varying predetermined zones comprising an oscillatable lever, an eccentric carried thereby, and an operable connection between the eccentric and adjusting screw.

5. In a machine tool organization the combination of a bed, a slide carried thereby and shiftable relative thereto, an adjusting screw coupled with the slide for adjusting the position of the slide, means for axially reciprocating the screw for shifting the slide through varying predetermined zones comprising an oscillatable lever, an eccentric carried thereby, and an operable connection between the eccentric and adjusting screw, said lever being oscillatable through a given arc, and additional means for varying the throw of the eccentric without changing the arc of oscillation of the lever.

6. In a grinding machine of the class described the combination of a pair of opposed grinding and regulating wheels forming a grinding throat therebetween, means within the grinding throat for supporting work pieces for simultaneous engagement with the grinding and regulating wheels, a slide supporting one of said wheels for movement toward and from the other wheel to effect a relative feeding between the grinding wheel and work, and means for retracting the slide to enlarge the grinding throat to permit a replacement of the work therein including a manually oscillatable lever, an eccentric associated with the lever for effecting the reciprocations of the slide, and means for varying the throw of the eccentric.

7. In a device for reciprocating a member of a machine tool organization comprising a bed, a member supported thereby, an oscillatable lever, an eccentric operable by said lever, means connecting the eccentric with the member whereby oscillations of the lever are converted into reciprocations of the member, and means for varying the throw of the eccentric comprising a shaft coupled with the lever and oscillatable about its axis, and a second shaft carried by the lever shaft eccentric thereto and adjustable relative to one another to vary the eccentric relation of the axes of the first and second shafts.

8. In a device for reciprocating a member in a machine tool organization comprising a bed, a member carried thereby, an oscillatable lever movable in an arcuate path in the direction of movement of the member, an eccentric operable by the lever operatively connected with the member, and means changing the throw of the eccentric.

9. In a mechanism for reciprocating a member of a machine tool organization the combination with a bed, of a member carried thereby for shifting movement relative thereto, a manually oscillatable handle, a shaft carried by the handle, an eccentric on the shaft having a connection with the member, and means varying the separation of the axes of the eccentric and shaft to thereby change the throw of the eccentric and the length of stroke of the member reciprocated thereby.

10. In a mechanism for reciprocating a member of a machine tool organization the combination with a bed, of a member carried thereby for shifting movement relative thereto, a manually oscillatable handle, a shaft carried by the handle, an eccentric on the shaft having a connection with the member, means varying the separation of the axes of the eccentric and shaft to thereby change the throw of the eccentric and the length of stroke of the member reciprocated thereby, said means comprising an adjusting lever on the shaft shiftable with respect to the handle, and means for locking the shaft in its adjusted position.

11. In a mechanism of the class described the combination of a bed, a member carried thereby for movement relative thereto, and means for effecting said movement of the member comprising a bracket mounted on the bed, a hollow shaft journaled in and extending beyond said bracket, a handle secured to the extended end of the hollow shaft, an eccentric shaft journaled in the hollow shaft for movement therewith about the axis of the hollow shaft, an eccentric carried by the eccentric shaft connected with the member for moving same upon movement of the handle, and means varying the throw of the eccentric without effecting the zone of movement of the handle.

12. In a mechanism of the class described the combination of a bed, a member carried thereby for movement relative thereto, a bracket secured to the bed, a hollow shaft journaled in said bracket, an eccentric shaft rotatably carried by the hollow shaft, an eccentric shoe eccentrically mounted in the eccentric shaft and having a connection with the shiftable member, a handle operatively connected with the hollow shaft for oscillating same about its axis together with the parts carried thereby, the handle having a definite path of movement, and means for adjusting the axes of the hollow shaft, eccentric shaft and shoe relative to one another to thereby vary the throw of the shoe while oscillating the handle through the definite path of movement.

13. In a mechanism of the class described the combination of a bed, a member carried thereby for movement relative thereto, a bracket secured to the bed, a hollow shaft journaled in said bracket, an eccentric shaft rotatably carried by the hollow shaft, an eccentric shoe eccentrically mounted in the eccentric shaft and having a connection with the shiftable member, a handle operatively connected with the hollow shaft for oscillating same about its axis together with the parts carried thereby, the handle having a definite path of movement, means for adjusting the axes of the hollow shaft, eccentric shaft and shoe relative to one another to thereby vary the throw of the shoe while oscillating the handle through the definite path of movement, means for locking the shafts and shoe in adjusted positions, and means for indicating said position and the amount of throw of the shoe.

14. In a mechanism of the class described the combination of a bed, a member carried thereby for movement relative thereto, a bracket secured to the bed, a hollow shaft journaled in said bracket, an eccentric shaft rotatably carried by the hollow shaft, an eccentric shoe eccentrically mounted in the eccentric shaft and having a connection with the shiftable member, a handle operatively connected with the hollow shaft for oscillating same about its axis together with the parts carried thereby, the handle having a definite path of movement, means for adjusting the axes of the hollow shaft, eccentric shaft and shoe relative to one another to thereby vary the throw of the shoe while oscillating the handle through the definite path of movement, means for locking the shafts and shoe in adjusted positions, means for indicating said positions and the amount of throw of the shoe, and means for changing the zone of movement of the member.

15. In a centerless grinder the combination of a bed, a pair of opposed grinding and regulating wheels, a slide on the bed supporting one of said wheels for movement toward and from the other, the proximate portion of said wheels being spaced from one another to form a grinding throat therebetween, a work rest within the grinding throat for supporting a work piece in simultaneous engagement with the wheels, means for shifting the slide comprising a manually shiftable lever, a shaft on the end of the lever, an eccentric carried by the shaft having a connection with the slide whereby oscillations of the lever are converted into reciprocations of the slide, and means operable by the lever when retracting the slide for ejecting the work piece from the grinding throat.

16. In a centerless grinder the combination of a bed, a pair of opposed grinding and regulating wheels, a slide on the bed supporting one of said wheels for movement toward and from the other, the proximate portion of said wheels being spaced from one another to form a grinding throat therebetween, a work rest within the grinding throat for supporting a work piece in simultaneous engagement with the wheels, means for shifting the slide comprising a manually shiftable lever, a shaft on the end of the lever, an eccentric carried by the shaft having a connection with the slide whereby oscillations of the lever are converted into reciprocations of the slide, means operable by the lever when retracting the slide for ejecting the work piece from the grinding throat including a stop and ejector pin operable from a work movement limiting position to a work ejecting position, and additional means for returning the pin from an ejecting position to a work limiting position.

17. In a grinding machine the combination of a bed, a grinding wheel rotatably mounted thereon, a work support carried by the bed for movement relative thereto toward and from the grinding wheel, a lever carried by the bed and manually oscillatable relative thereto in a direction indicative of the direction of movement of the work support relative to the grinding wheel, means for connecting the lever with the work rest whereby oscillations of the lever are converted into reciprocations of the said work rest, and means for varying the amplitude of work support reciprocations for a given arc of oscillation of the lever.

18. In a centerless grinder the combination of a bed, a pair of opposed grinding and regulating wheels mounted thereon and forming a grinding throat therebetween, a work rest blade within the grinding throat, a stop and ejector pin for terminal engagement with the work for positioning same relative to the blade, a rotary shaft for effecting axial reciprocation of the stop and ejector pin for ejecting the work from the blade, an oscillatable member carried by the bed, a pivotally mounted pendant carried by the oscillatable member, means for limiting the independent oscillation of the pendant, and means adapted to be engaged by the pendant during the oscillation of the member for effecting the rotation of the shaft and ejection of the work.

19. In a work ejecting mechanism, the combination of a support for a work piece, an axially shiftable ejector pin, a rotary shaft for shifting the pin, a rotatable member for effecting the rotation of the shaft, and means oscillatable in an orbital path relative to the oscillatable member for effecting its actuation and the resultant ejection of the work.

20. In a device of the class described the combination of a bed, a slide carried thereby and shiftable relative thereto in forward and reverse directions, a manually oscillatable lever mounted on the bed for oscillation in the same direction as the slide for effecting said movements of the slide, a work support, means for ejecting the work from the support in timed relation with the reciprocation of the slide, and means for connecting the oscillatable lever with the ejector for operating same thereby when the lever is actuated in a given direction.

In testimony whereof I affix my signature.

HANS FRITSCHI.